US012254363B2

(12) United States Patent
Wakai

(10) Patent No.: US 12,254,363 B2
(45) Date of Patent: Mar. 18, 2025

(54) INFORMATION PROCESSING APPARATUS, INFORMATION PROCESSING METHOD, INSPECTION SYSTEM AND STORAGE MEDIUM

(71) Applicant: CANON KABUSHIKI KAISHA, Tokyo (JP)

(72) Inventor: Kazuo Wakai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/852,924

(22) Filed: Jun. 29, 2022

(65) Prior Publication Data

US 2023/0011106 A1 Jan. 12, 2023

(30) Foreign Application Priority Data

Jul. 6, 2021 (JP) ................................ 2021-112127

(51) Int. Cl.
*G06F 3/12* (2006.01)
*G06K 15/00* (2006.01)

(52) U.S. Cl.
CPC .................................. *G06K 15/408* (2013.01)

(58) Field of Classification Search
CPC ......................... G06K 15/408; H04N 1/00092
See application file for complete search history.

(56) References Cited

U.S. PATENT DOCUMENTS

2002/0145770 A1* 10/2002 Nomura ............. H04N 1/00411 358/505
2006/0115127 A1* 6/2006 Hatayama ............ G06V 10/993 382/112
2007/0279656 A1* 12/2007 Yamauchi ............ H04N 1/6058 358/448
2012/0163852 A1* 6/2012 Kimura .............. G03G 15/5062 399/82
2015/0273816 A1* 10/2015 Schumann .............. G06T 7/001 382/112

FOREIGN PATENT DOCUMENTS

JP 11340110 A * 12/1999 ....... G05B 19/41865
JP 2008003876 A * 1/2008
JP 2019025871 A 2/2019
JP 2019048387 A 3/2019
JP 2020038150 A * 3/2020
JP 2021075389 A 5/2021
JP 2021078083 A 5/2021

* cited by examiner

*Primary Examiner* — Huo Long Chen
(74) *Attorney, Agent, or Firm* — ROSSI, KIMMS & McDOWELL LLP

(57) ABSTRACT

The inspection device determines whether or not it is possible to inspect whether or not the imaged image of the surface to be inspected has a defect based on the comparison between the imaged image imaged of the surface to be inspected of the printed matter and the reference image. Whether or not to execute the processing related to printing is controlled according to the determination result of whether or not the inspection device can execute the inspection.

22 Claims, 11 Drawing Sheets

FIG. 7

| REFERENCE NUMBER | JOB TYPE |
|---|---|
| 1 | PROOF JOB |
| 2 | CALIBRATION JOB |

FIG. 10

| REFERENCE NUMBER | JOB TYPE |
| --- | --- |
| 1 | COPY |
| 2 | |

INFORMATION PROCESSING APPARATUS, INFORMATION PROCESSING METHOD, INSPECTION SYSTEM AND STORAGE MEDIUM

BACKGROUND OF THE INVENTION

Field of the Invention

The present invention relates to an information processing apparatus, an information processing method, an inspection system and a storage medium.

Description of the Related Art

An image inspection apparatus which reads a printed matter printed by a printer and inspects the quality of the printed matter is known. The image inspection apparatus can detect image defects such as dirt and print omission, errors in characters, bar code quality, and the like. For example, Japanese Patent Application Laid-Open No. 2021-078083 discloses an example of the image inspection apparatus.

If the image inspection apparatus and the printer are independently operable on one side, including a power source, the one apparatus may be able to execute the processing without depending on a state of the other apparatus. Under such conditions, for example, when the operation of the image inspection apparatus is restricted, it can be assumed that a printed matter corresponding to a print result by the printer is not inspected even though the inspection is scheduled, and as a result, the printed matter is treated as defective. Consequently, there is a need to realize a mechanism capable of linking the image inspection apparatus and the printer, which can operate independently, in a more suitable manner.

SUMMARY OF THE INVENTION

In view of the above problems, it is an object of the present invention to link the image inspection apparatus and the printer in a more suitable manner.

In an aspect of the present disclosure, an information processing apparatus comprises at least one processor and at least a memory coupled to the at least one processor and having instructions stored thereon, and when executed by the at least one processor, acting as: a determination unit configured to determine whether or not an image inspection apparatus is operable to execute an inspection of the presence of defects in a captured image capturing a surface to be inspected of a printed matter; and a controller configured to control the execution of processes associated with printing based on a result of the determination by the determination unit.

Further features of the present invention will become apparent from the following description of exemplary embodiments with reference to the attached drawings.

BRIEF DESCRIPTION OF THE DRAWINGS

FIG. 7 is a diagram showing an example of the management table related to the management of jobs that do not require inspection.

FIG. 10 is a diagram showing an example of the management table related to the management of jobs that do not require inspection.

DESCRIPTION OF THE EMBODIMENTS

Figure 1:
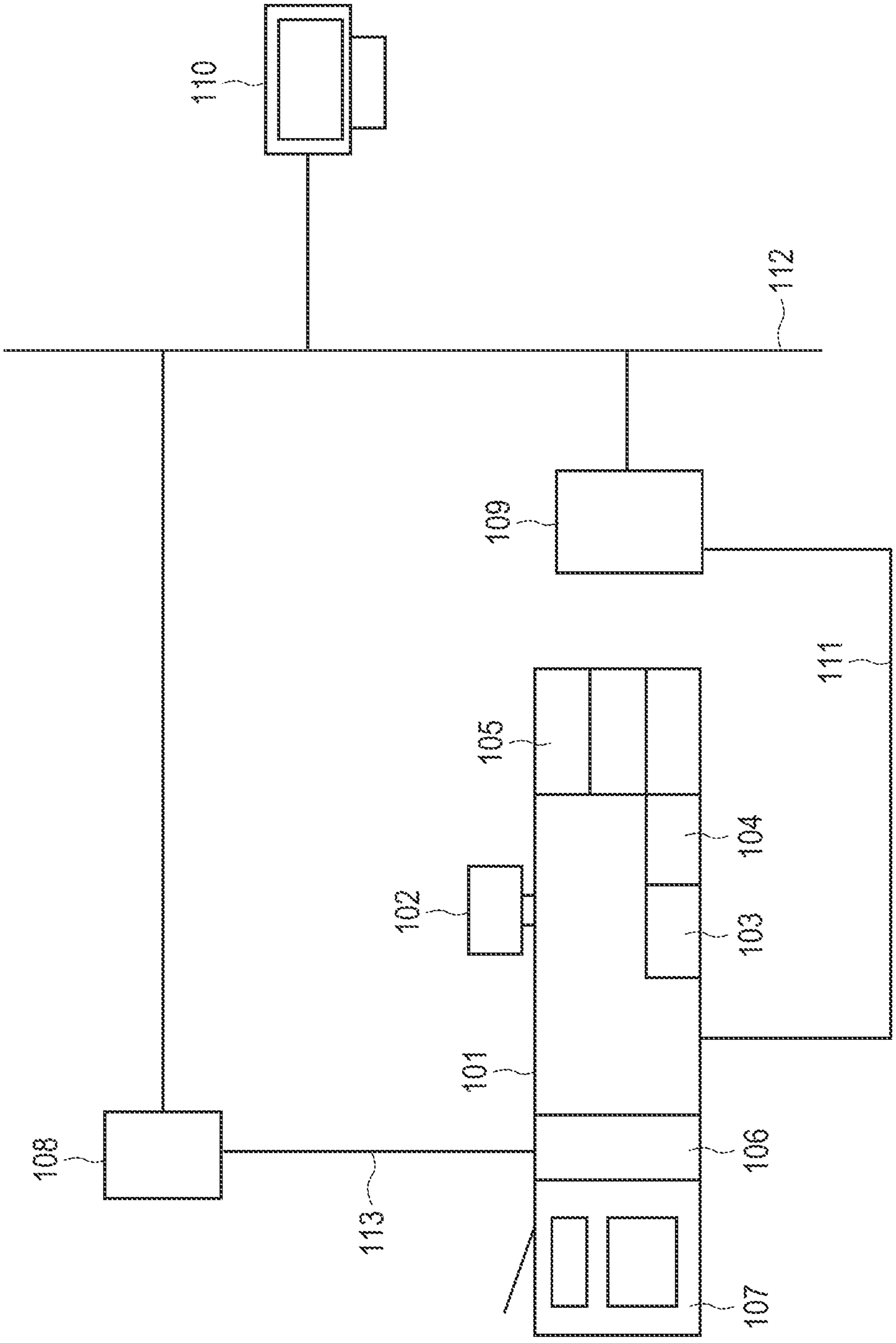
FIG. 1 is a diagram showing an example of the system configuration of the inspection system.

Embodiments of the present invention will now be described with reference to the drawings. In the present specification and the drawings, components having substantially the same functional configuration are denoted by the same reference numerals, thereby omitting the redundant description.

Unless otherwise stated, it is needless to say that the present invention can be applied to a single apparatus or to an inspection apparatus comprising a plurality of apparatuses, provided that the functions of the present invention are realized. Unless otherwise stated, it is needless to say that the present invention can be applied to an inspection apparatus which is connected via a network such as a LAN (Local Area Network) or WAN (Wide Area Network) and performs processing, provided that the functions of the present invention are realized. That is, the system configuration in which various terminals described in the following embodiments are connected is only one example, and it goes without saying that there are various configuration examples depending on the use and purpose. It is noted that the terms "paper" and "sheet(s)" may be used to indicate "sheet(s) of paper" in the following descriptions.

[System Configuration]

An example of the system configuration of the inspection system according to the present embodiment will be described with reference to FIG. 1. As shown in FIG. 1, the inspection system according to the present embodiment includes a printer 101, an information processing apparatus 109, and an inspection apparatus 108. In this embodiment, a case where an electrophotographic printer is applied as the printer 101 will be described, but the configuration of the printer 101 is not necessarily limited. As the printer 101, a printer using another image forming method different from the electrophotographic method, such as an ink jet method, an offset method, or the like, may be applied. The inspection apparatus 108 corresponds to a so-called image inspection apparatus.

The printer 101 is connected to the information processing apparatus 109 via a cable 111. An information processing apparatus 109 is connected to a client computer 110 and the inspection apparatus 108 through a network 112.

The printer 101 includes a UI panel 102, a paper feed deck 103, and a paper feed deck 104. An optional deck 105 may be connected to the printer 101. For example, in the example shown in FIG. 1, an option deck consisting of three paper feed decks is applied as the optional deck 105. The printer 101 is, for example, an electrophotographic printer. The UI panel 102 is a user interface used for presenting information to the user and receiving instructions from the user. For example, the UI panel 102 may include a capacitive touch panel.

The printer 101 includes an inspection unit 106 and a large-capacity stacker 107. The inspection unit 106 is connected to the inspection apparatus 108 through a cable 113. The large-capacity stacker 107 includes, for example, a main tray and a top tray, and several thousand sheets of paper can be stacked on the main tray at one time.

A job (hereinafter also referred to as a "print job") related to printing of a printed matter is, for example, generated by the client computer 110, transmitted to the information processing apparatus 109 via the network 112, and managed by the information processing apparatus 109. Thereafter, the print job is transmitted from the information processing apparatus 109 to the printer 101 via the cable 111. The printer 101 executes processing related to printing (for example, image formation, printing, etc.) on a recording medium such as a sheet, based on the print job transmitted from the information processing apparatus 109.

The client computer 110, the information processing apparatus 109, and the inspection apparatus 108 may be connected to the cable 111, for example, so that they can communicate with the printer 101 via the cable 111. That is, the connection configuration of the printer 101, the information processing apparatus 109, and the client computer 110 shown in this embodiment is only an example, and it is needless to say that various connection configurations can be applied in addition to the examples shown in this embodiment.

<Control Configuration>

Figure 2:
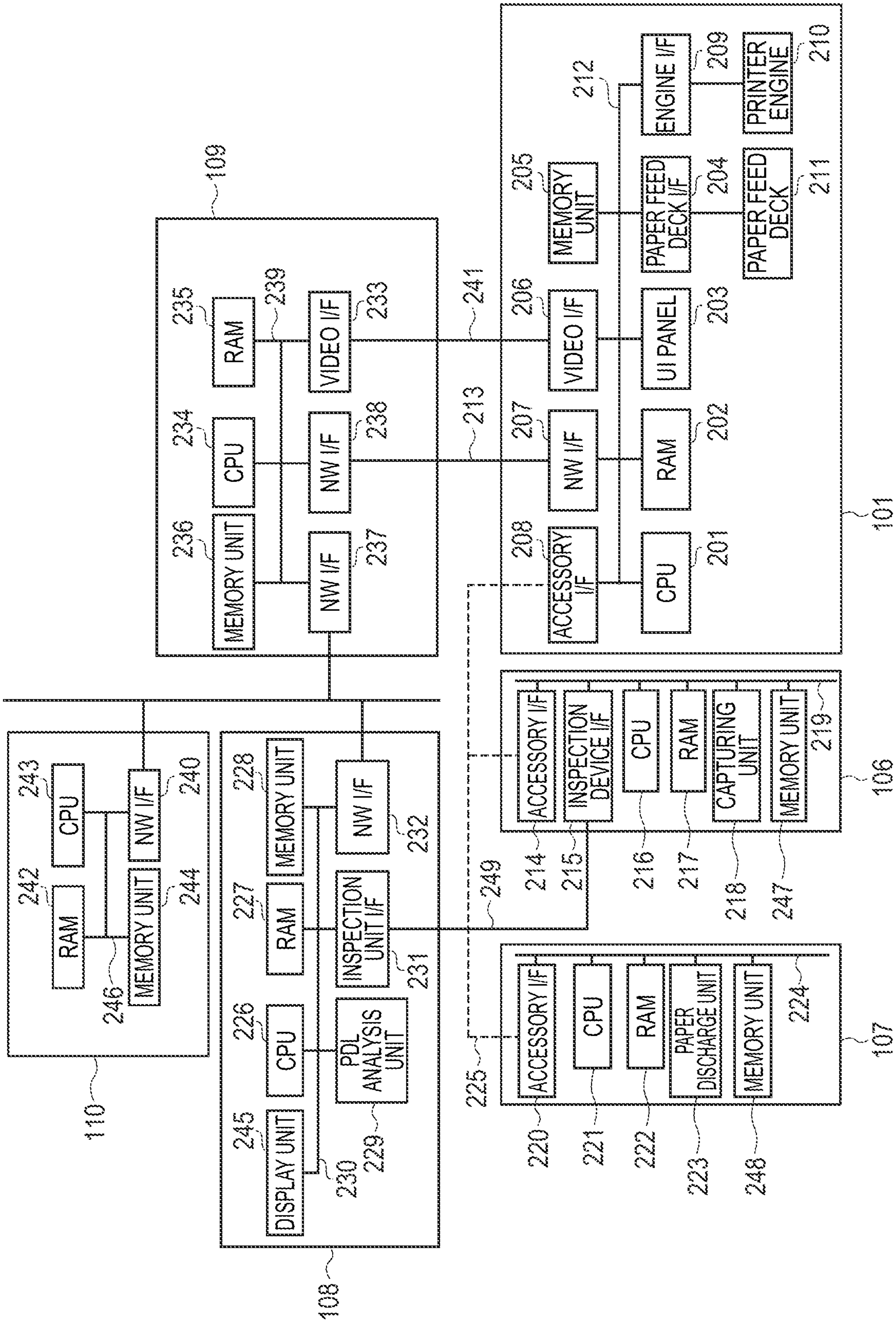
FIG. 2 is a block diagram showing an example of the control configuration of the inspection system.

With reference to FIG. 2, an example of a control configuration of the inspection system according to the present embodiment will be described with particular attention to the configurations of the printer 101, the inspection apparatus 108, the large-capacity stacker 107, the information processing apparatus 109, and the client computer 110.

A CPU (Central Processing Unit) 201 controls and performs operations in each part of the printer 101 via a system bus 212. The CPU 201 executes a program stored in a memory unit 205 and loaded into a RAM (Random Access Memory) 202. The RAM 202 is a type of general volatile storage device directly accessible from the CPU 201 and is used as a work area of the CPU 201 or other temporary data storage area. The memory unit 205 functions as a temporary storage area and a work memory during the operation of the printer.

An engine I/F 209 manages communications with and control of a printer engine 210. A paper feed deck I/F 204 manages communications with and control of a paper feed deck 211. The paper feed deck 211 generally refers to the paper feed decks 103 and 104 and the optional deck 105 as a hard configuration. A UI panel 203 is a hard configuration of the UI panel 102 and is a user interface for performing general operations of the printer 101. In this embodiment, the UI panel 203 includes a capacitive touch panel.

A network interface (hereinafter also referred to as "NW I/F") 207 is connected to a NW I/F 238 of the information processing apparatus 109 via a cable 213, and controls communications between the information processing apparatus 109 and the printer 101. In this example, the interfaces connected to the system buses 212 and 239 are directly connected to each other, but the information processing apparatus 109 and the printer 101 may be connected by a network, for example, and the connection type is not limited. A video I/F 206 is connected to a video I/F 233 via a video cable 241 and controls communications of image data between the information processing apparatus 109 and the printer 101.

The connection interface between the information processing apparatus 109 and the printer 101 may be formed by integrating the functions of the NW I/F 238 and the video I/F 233. The connection interface of the printer 101 with the information processing apparatus 109 may be formed by integrating the functions of the NW I/F 207 and the video I/F 206.

An accessory I/F 208 is connected to an accessory I/F 214 and an accessory I/F 220 through a cable 225. That is, the printer 101 communicates with each of the inspection unit 106 and the large-capacity stacker 107 via the accessory interfaces 208, 214, and 220.

A CPU 216 controls and operates the respective parts in the inspection unit 106 via a system bus 219. The CPU 216 executes a program stored in a memory unit 247 and loaded into a RAM 217. The RAM 217 is a type of general volatile storage device directly accessible from the CPU 216 and is used as a work area of the CPU 216 or other temporary data storage area.

The memory unit 247 functions as a temporary storage area and a work memory during operation of the inspection unit 106. An inspection apparatus I/F 215 is connected to an inspection unit I/F 231 via a cable 249. That is, the inspection unit 106 communicates with the inspection apparatus 108 via the inspection apparatus I/F 215 and the inspection unit I/F 231.

A capturing unit 218 has a capturing function equipped with, for example, a conductor image sensor (hereinafter also referred to as "CIS"), captures a sheet passing through the inspection unit 106, and transmits an image corresponding to the capturing result to the inspection apparatus 108 via the inspection apparatus I/F 215. The CIS mounted on the capturing unit 218 is merely an example of a sensor used for capturing an image, and may be another type of sensor such as a CCD image sensor, and its capturing method is not limited.

A CPU 221 controls and performs operations in each part of the large-capacity stacker 107 via a system bus 224. The CPU 221 executes a program stored in a memory unit 248 and loaded into a RAM 222. The RAM 222 is a type of general volatile storage device directly accessible from a CPU 221 and is used as a work area of the CPU 221 or other temporary data storage area. The memory unit 248 functions as a temporary storage area and a work memory during operation of the large-capacity stacker 107. A paper discharge unit 223 controls paper discharge operations of the main tray and the top tray, and also controls and monitors a loading state of each of the main tray and the top tray.

A CPU 226 controls and operates each part of the inspection apparatus 108 via a system bus 230. The CPU 226 executes a program stored in a memory unit 228 and loaded into a RAM 227. The RAM 227 is a type of general volatile storage device directly accessible from the CPU 226 and is used as a work area of the CPU 226 or other temporary data storage area. The memory unit 228 functions as a temporary storage area and a work memory during the operation of the inspection apparatus. A PDL analysis unit 229 reads PDL data such as PDF, PostScript, PCL, etc., received from the client computer 110 and the information processing apparatus 109, and executes processing related to interpretation of the PDL data. A display unit 245 is realized, for example, by a liquid crystal display connected to the inspection device, and receives instructions from a user to the inspection apparatus 108 and displays information about a state of the inspection apparatus 108 to the user.

A CPU 234 controls and performs operations in each section of the information processing apparatus 109 via a system bus 239. The CPU 234 executes a program stored in a memory unit 236 and loaded into a RAM 235. The RAM 235 is a type of general volatile storage device directly accessible from the CPU 234 and is used as a work area of the CPU 234 or other temporary data storage area. The memory unit 236 functions as a temporary storage area and a work memory during operation of the information processor. A NW I/F 237 is connected to a NW I/F 232 and a NW I/F 240 through a network. The information processing apparatus 109 communicates with the inspection apparatus 108 via the NW I/F 237 and the NW I/F 232. The information processing apparatus 109 communicates with the client computer 110 via the NW I/F 237 and the NW I/F 240.

A CPU 243 controls and performs operations in each part of the client computer 110 via a system bus 246. The CPU 243 executes a program stored in a memory unit 244 and loaded into a RAM 242. The RAM 242 is a type of general volatile storage device directly accessible from the CPU 243 and is used as a work area of the CPU 243 or other temporary data storage area. The memory unit 244 functions as a temporary storage area and a work memory during operation of the client computer 110.

<Internal Configuration>

Figure 3:
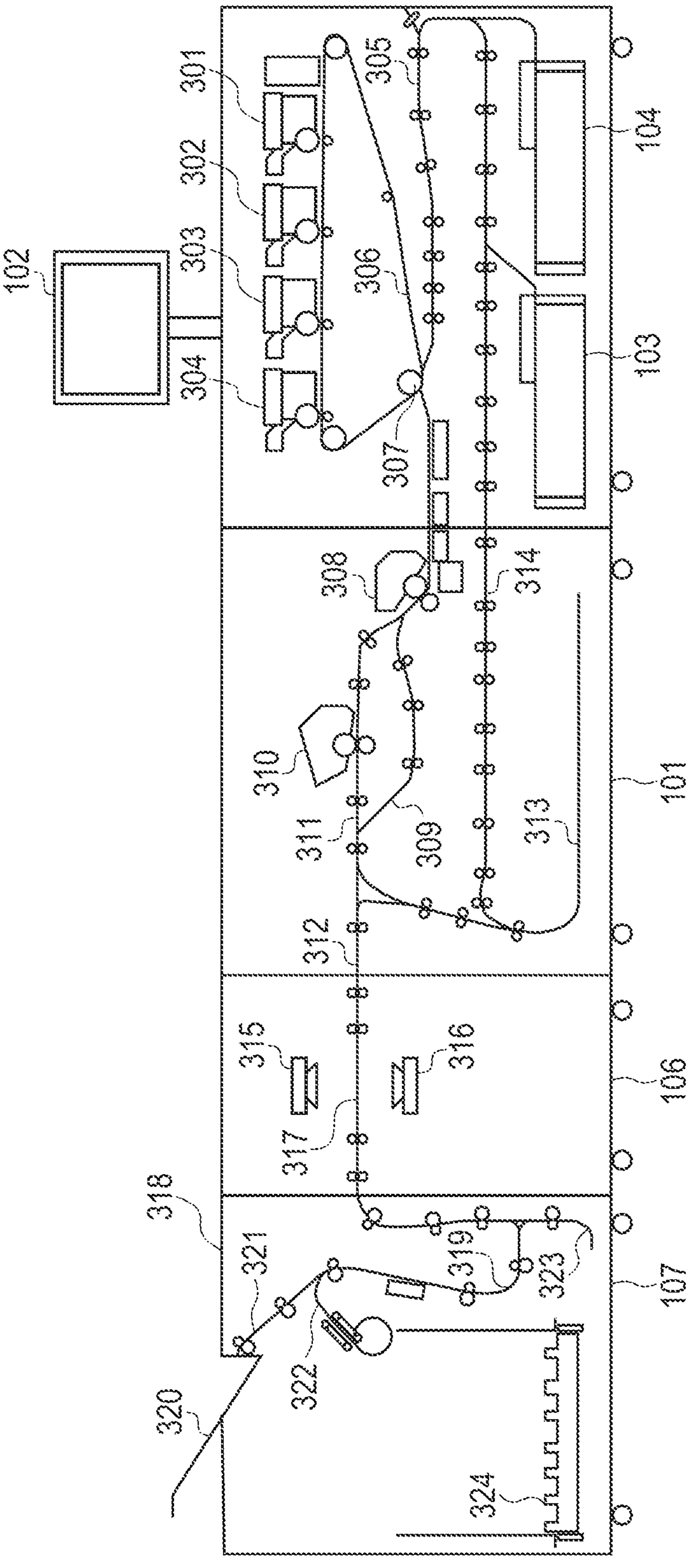
FIG. 3 is a diagram showing an example of the internal configuration of the inspection system.

Referring to FIG. 3, an example of the internal configuration of the printer 101, the inspection unit 106, and the large-capacity stacker 107 in the inspection system according to the present embodiment will be described.

The printer 101 receives a user's input via the UI panel 102 and displays states of printing and equipment on the UI panel 102. Various types of paper can be stored in the paper feed decks 103 and 104. In each paper feed deck, one sheet of the uppermost sheet of the stored sheets can be separated and conveyed to a sheet conveying path 305.

The developing stations 301 to 304 form a toner image using colored toners of Y (yellow), M (magenta), C (cyan), and K (black), respectively, to form a color image. The toner image formed here is primarily transferred to an intermediate transfer belt 306. The intermediate transfer belt 306 rotates clockwise in the figure and transfers the toner image to a sheet conveyed from the sheet conveying path 305 at a secondary transfer position 307.

A fixing unit 308 is provided with a pressure roller and a heating roller, and the toner image is fixed to the sheet by melting and pressure-bonding the toner by passing the sheet between the rollers. The sheet having passed through the fixing unit 308 is conveyed to a sheet conveying path 309 to a sheet conveying path 312. If further melting/crimping is required for fixing, depending on the type of paper, the sheet is conveyed to a second fixing unit 310 through the above sheet conveying path after passing through the fixing unit 308, and is conveyed to the sheet conveying path 312 through a sheet conveying path 311 after additional melting/crimping is performed.

If the image forming mode is double-sided, the sheet is conveyed to a sheet reversing path 313. After the paper is reversed at the sheet reversing path 313, the paper is conveyed to a double-sided conveying path 314, and the image of the second side is transferred at the secondary transfer position 307.

A CIS 315 and a CIS 316 are arranged in the inspection unit 106 to face each other.

The CIS 315 is a sensor for reading the upper surface of the sheet. The CIS 316 is a sensor for reading the lower surface of the sheet. The inspection unit 106 scans (captures) the sheet using the CIS 315 and the CIS 316 at the timing when the paper conveyed to a paper conveying path 317 reaches a predetermined position. The scanned image (captured image) is transmitted to the inspection apparatus 108 via the inspection apparatus I/F 215 and the inspection unit I/F 231. The CPU 226 determines whether or not the received image has a defect, and notifies the result of the determination to the inspection unit 106 again via the inspection unit I/F 231 and the inspection apparatus I/F 215. The CPU 216 notifies the large-capacity stacker 107 of the received determination result via the accessory interfaces 214 and 220.

The symbol 107 denotes a large-capacity stacker capable of stacking a large number of sheets. The large-capacity stacker 107 has a main tray 324 as a tray for stacking sheets. The sheet having passed through the inspection unit 106 enters the large-capacity stacker 107 through the sheet conveying path 319. The sheets are stacked on the main tray 324 from the sheet conveying path 319 via a sheet conveying path 322.

The large-capacity stacker 107 has a top tray 320 as a paper discharge tray. The CPU 221 ejects the sheet in which a defect is detected by the inspection apparatus 108 to the top tray 320. When the sheet is output to the top tray 320, the sheet is conveyed from the sheet conveying path 319 to the top tray 320 via the paper conveying path 321. The symbol 323 denotes a reversing unit for reversing a sheet. The reversing unit 323 is used for stacking sheets in the main tray 324. If the sheets are stacked in the main tray 324, the sheets are once reversed by the reversing unit 323 so that the direction of the sheets entering the large-capacity stacker 107 becomes same as the direction of the sheets stacked. The reversing operation by the reversing unit 323 is not performed when the sheets are conveyed to the top tray 320, because the stacked sheets are discharged as it is without flipping.

<Processing>

The processing of the inspection system according to the present embodiment will be described with reference to FIGS. 4 to 7.

First, with reference to FIG. 4, an example of the processing of the inspection apparatus 108 will be described with attention to the basic operation of the inspection apparatus 108 at the time of inspecting printed matter output from the printer 101 in accordance with the execution result of the processing related to printing.

In step S401, the CPU 226 receives an instruction to start reading an image from the user via the display unit 245.

In step S402, the inspection unit I/F 231 notifies the inspection unit 106 through the inspection apparatus I/F 215 that the inspection apparatus 108 is operable to read the image.

In step S403, the inspection unit I/F 231 determines, based on a notification from the inspection apparatus I/F 215, whether or not it is detected that the sheet (printed matter) to be inspected has been conveyed to the inspection unit 106.

If the inspection unit I/F determines that the sheet to be inspected has not been detected to be conveyed to the inspection unit 106, the inspection unit I/F 231 continues to wait for notification from the inspection apparatus I/F 215 in step S403.

If the inspection unit I/F 231 determines that the sheet to be inspected has been conveyed to the inspection unit 106, the process proceeds to step S404.

In step S404, the inspection unit I/F 231 receives from the inspection apparatus I/F 215 an image (hereinafter also referred to as "scanned image") corresponding to the scan results (in other words, the capturing result) by the CIS 315 and the CIS 316.

In step S405, the CPU 226 compares the reference image stored in the RAM 227 with the scan image to be inspected received in step S405. As for the reference image, for example, a scan image obtained by scanning a printed matter corresponding to a print result by the printer 101 using the CIS 315 and the CIS 316 before starting the series of processes shown in FIG. 4 is used. The scanned image is, for example, transmitted from the inspection apparatus I/F 215 to the inspection unit I/F 231, and stored in the RAM 227.

An example of a process for comparing a reference image with a scan image will now be described. In the process relating to the comparison, first, characteristic points extracted from each of the reference image and the scan image to be inspected are used as reference points for alignment, so that the image positions of the reference image and the scan image are aligned. Next, with respect to the scan image to be inspected, the presence of positional deviation of the image with respect to the sheet is inspected by analyzing the four corners of the sheet along with the reference points for alignment of the scan image. Then, density values of the reference image and the scan image to be inspected are compared for each pixel. As a result, if no defect is detected, the inspection result is recognized as "passed".

The inspection method of the scan image based on the comparison between the reference image and the scan image described above is only an example, and if it is possible to inspect the scan image by detecting a defect from the scan image of the printed matter, the inspection method is not particularly limited. As a specific example, an image analysis may be performed on a scan image of a printed matter, and the scan image may be inspected by determining whether or not a feature corresponding to a defect has been detected based on the result of the image analysis.

In step S406, the CPU 226 determines whether or not the inspection result shows "passed" based on the comparison result in step S405.

If the CPU 226 determines that the inspection result shows "passed" in step S406, the CPU advances the process to step S407. In step S407, the inspection unit I/F 231 notifies the inspection apparatus I/F 215 that the inspection result shows "passed", so as to instruct paper discharge of the target printed matter to the main tray 324 of the large-capacity stacker 107.

If it is determined that the inspection result shows "failed" in step S406, the CPU 226 advances the process to step S408. In step S408, the inspection unit I/F 231 notifies the inspection apparatus I/F 215 that the inspection result shows "failed", and instructs to discharge the target printed matter to the top tray 320 of the large-capacity stacker 107.

In step S409, the CPU 226 determines whether or not the inspection of the last sheet has been completed.

If it is determined in S409 that the inspection of the last sheet has not been completed, the CPU 226 advances the process to S403. In this case, the processes of steps S403 to S409 are executed again for the sheet whose inspection has not been completed.

If the CPU 226 determines that the inspection of the last sheet is completed in step S409, the CPU advances the process to step S410. In step S410, the CPU 226 receives an instruction related to the end of reading the image from the user via the display unit 245.

Figure 4:
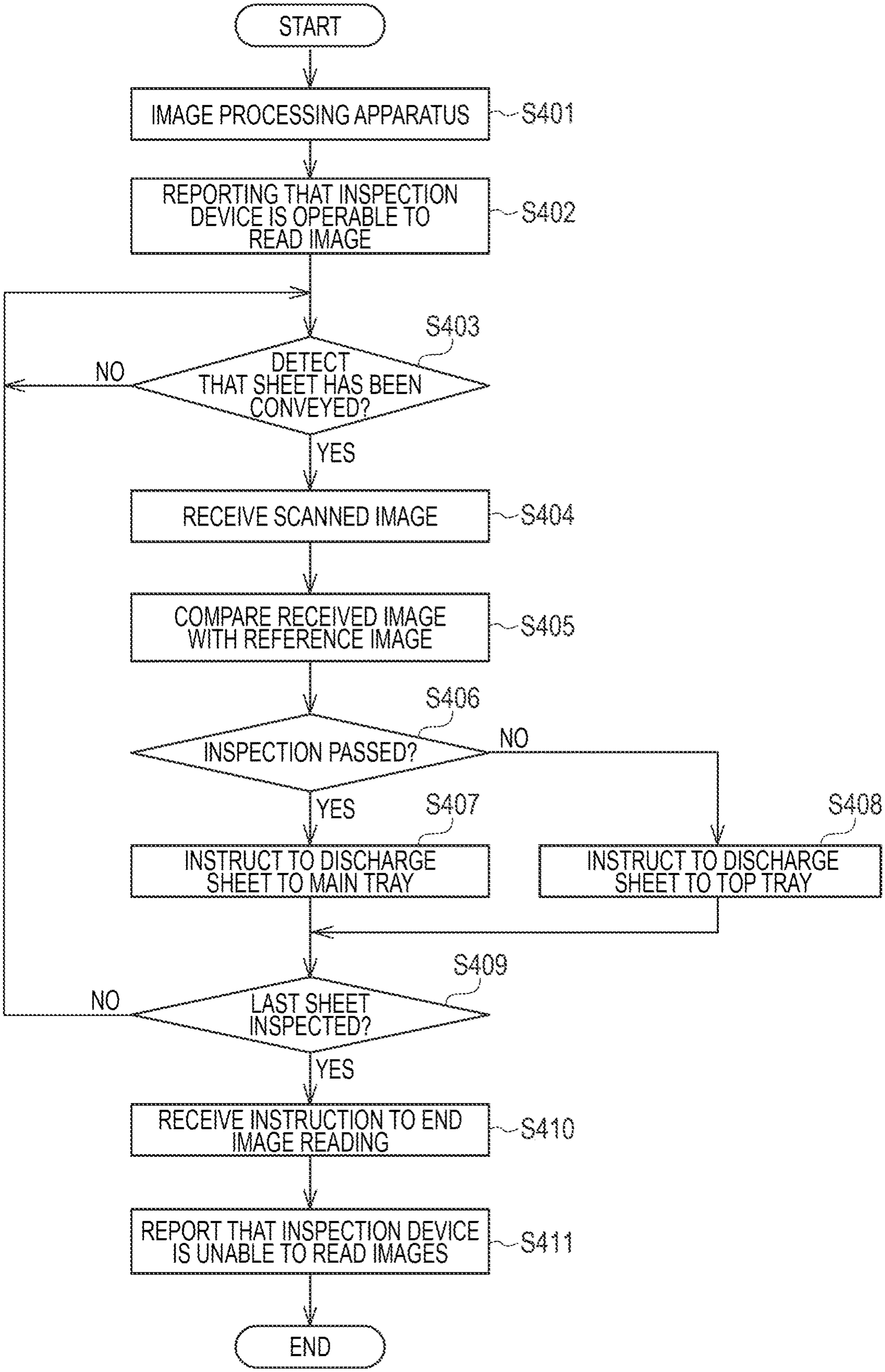
FIG. 4 is a flowchart showing an example of the processing of the inspection apparatus.

In step S411, the inspection unit I/F 231 notifies the inspection unit 106 through the inspection apparatus I/F 215 that the inspection apparatus 108 is in a state in which reading of an image is impossible, and ends the series of processes shown in FIG. 4.

Next, with reference to FIG. 5, an example of the processing performed by the printer 101 and the inspection unit 106 during the inspection of the printed matter will be described.

In step S501, the printer 101 receives a print job under control of the CPU 201.

In step S502, the CPU 201 starts the printing process based on the print job received in step S501.

In step S503, the CPU 201 executes processing related to printing an image on a sheet (single sheet).

In step S504, the inspection apparatus I/F 215 notifies the inspection apparatus 108 via the inspection unit I/F 231 that the sheet (printed matter) to be inspected has been conveyed to the inspection unit 106.

In step S505, each of the CIS 315 and the CIS 316 scans an image printed on the conveyed sheet.

In step S506, the inspection apparatus I/F 215 transmits the image scanned in step S505 to the inspection unit I/F 231.

In step S507, the CPU 216 determines whether or not the inspection result of the image received by the inspection apparatus I/F 215 from the inspection unit I/F 231 and transmitted to the inspection unit I/F 231 in step S506 shows "failed".

If the CPU 216 determines that the inspection result shows "failed" in S507, the CPU advances the process to step S508. In step S508, the CPU 216 instructs each of the accessory interfaces 208, 214, and 220 to discharge the sheets (printed matters) determined as "failed" in the inspection result to the top tray 320.

If it is determined that the inspection result does not show "failed" in step S507, the CPU 216 advances the process to step S509. In step S509, the CPU 216 instructs each of the accessory interfaces 214 and 220 to discharge the sheets to be inspected to the destination specified by the print job.

In step S510, the CPU 201 determines whether or not the inspection of the last sheet has been completed.

If it is determined in step S510 that the inspection of the last sheet has not been completed, the CPU 201 advances the process to step S503. In this case, the processes of steps S503 to S509 are executed again for the sheets for which the inspection has not been completed.

Figure 5:
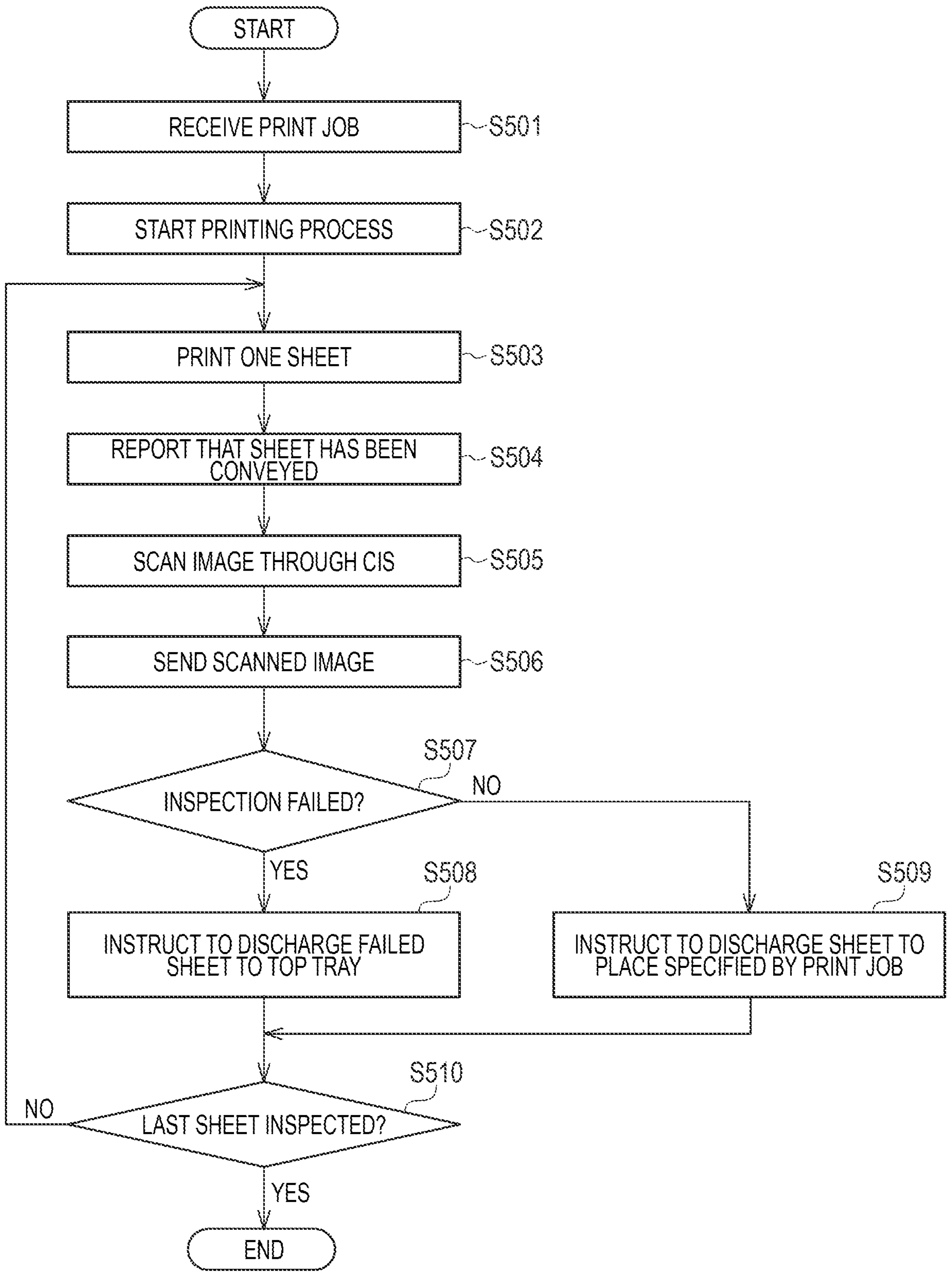
FIG. 5 is a flowchart showing an example of the processing of the printer and the inspection unit.

If the CPU determines that the inspection of the last sheet has been completed in step S510, the CPU 201 terminates the series of processes shown in FIG. 5, as the printing process has also been terminated.

Figure 6:
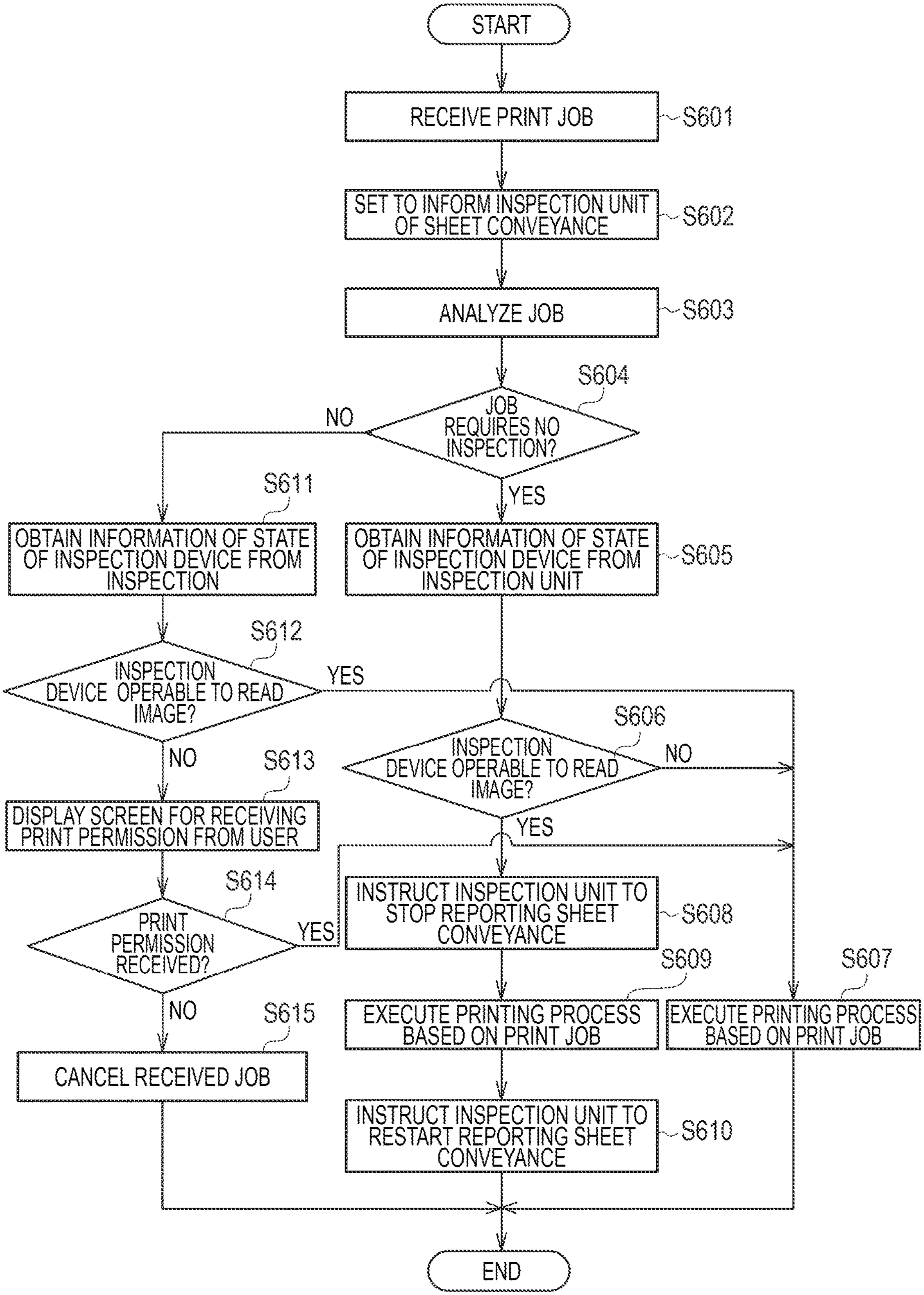
FIG. 6 is a flowchart showing an example of the processing of the printer and the inspection unit.

Next, with reference to FIGS. 6 and 7, an example of the processing of the printer 101 and the inspection unit 106 in the inspection system according to the present embodiment will be described. In this embodiment, descriptions will be given of an example in which the printer 101 and the inspection unit 106 use a state indicating whether or not the inspection apparatus 108 can read an image and a management table related to the management of job types not requiring inspection managed by the printer 101.

First, with reference to FIG. 6, an example of the processing of the printer 101 and the inspection unit 106 will be described.

In step S601, the CPU 201 accepts a print job.

In step S602, the CPU 201 sets the inspection unit 106 so that the inspection apparatus I/F 215 notifies the inspection unit I/F 231 of each conveyance of the sheet to be inspected.

In step S603, the CPU 201 analyzes the job received in step S601.

In step S604, the CPU 201 compares the analysis result of the job in step S603 with the management table shown in FIG. 7 to determine whether or not the received job corresponds to a job type requiring no inspection. FIG. 7 shows an example of a management table for managing job types of jobs that do not require the inspection. In the example shown in FIG. 7, if the job type of the target job is either "proof job" or "calibration job", it is determined that the job requires no inspection.

If the CPU 201 determines in step S604 that the received job corresponds to a job type that requires no inspection, the CPU advances the process to step S605. In step S605, the CPU 201 acquires from the inspection unit 106 information (for example, information indicating whether or not the image can be read) about the state of reading the image of the inspection apparatus 108.

In step S606, the CPU 201 determines, based on the information acquired in step S605, whether or not the inspection apparatus 108 is operable to read the image.

If it is determined in step S606 that the inspection apparatus 108 is unable to read the image, the CPU 201 advances the process to step S607. In step S607, the CPU 201 executes a process related to printing based on the print job received in step S601.

If the CPU determines in step S606 that the inspection apparatus 108 is operable to read the image, the CPU 201 advances the process to step S608. In step S608, the CPU 201 updates the setting so that the notification from the inspection apparatus I/F 215 to the inspection unit I/F 231 for each conveyance of the sheet to be inspected to the inspection unit 106 is stopped. As a result, the provision of the captured image (i.e., the image to be inspected) corresponding to the capturing result of the surface to be inspected of the printed matter from the inspection unit 106 to the inspection apparatus 108 is restricted.

Then, in step S609, the CPU 201 executes processing related to printing based on the job received in step S601.

Then, in S610, the CPU 201 updates the setting again so that the notification from the inspection apparatus I/F 215 to the inspection unit I/F 231 for each conveyance of the sheet to be inspected to the inspection unit 106 is resumed. As a result, in the subsequent processing, the restriction on the provision of the captured image from the inspection unit 106 to the inspection apparatus 108 corresponding to the capturing result of the surface to be inspected of the printed matter by the inspection unit 106 is lifted.

If the CPU determines in step S604 that the received job does not correspond to a job type requiring no inspection, the CPU 201 advances the process to step S611. In step S611, the CPU 201 acquires from the inspection unit 106 information about the state of the inspection apparatus 108 that performs reading of the image.

In step S612, the CPU 201 determines, based on the information acquired in step S611, whether or not the inspection apparatus 108 is operable to read the image.

If it is determined in step S612 that the inspection apparatus 108 is operable to read the image, the CPU 201 advances the process to step S607. In step S607, the CPU 201 executes processing related to printing based on the job received in step S601.

If the CPU determines in step S612 that the inspection apparatus 108 is unable to read the image, the CPU 201 advances the process to step S613. In step S613, the CPU 201 causes the UI panel 203 to display a screen (not shown) for receiving permission for printing a job from a user. The CPU 201 receives permission for printing a job from the user through the screen.

In step S614, the CPU 201 determines whether or not permission for printing the job has been received from the user via the screen displayed on the UI panel 203 in step S613.

If the CPU 201 determines that the permission for printing the job has been received from the user in step S614, the CPU advances the process to step S607. In step S607, the CPU 201 executes processing related to printing based on the job received in step S601.

If it is determined in step S614 that the permission for printing the job has not been received from the user, the CPU 201 advances the process to step S615. In step S615, the CPU 201 cancels the job received in step S601. Thus, the execution of processing related to printing based on the job is restricted.

Modified Example

Next, a modified example of the inspection system according to the present embodiment will be described with reference to FIGS. 8 to 11. In this modification, descriptions will be given of an example of a mechanism that enables registration of job types requiring no inspection based on an instruction from a user via the UI panel 102 of the printer 101.

Figure 8:
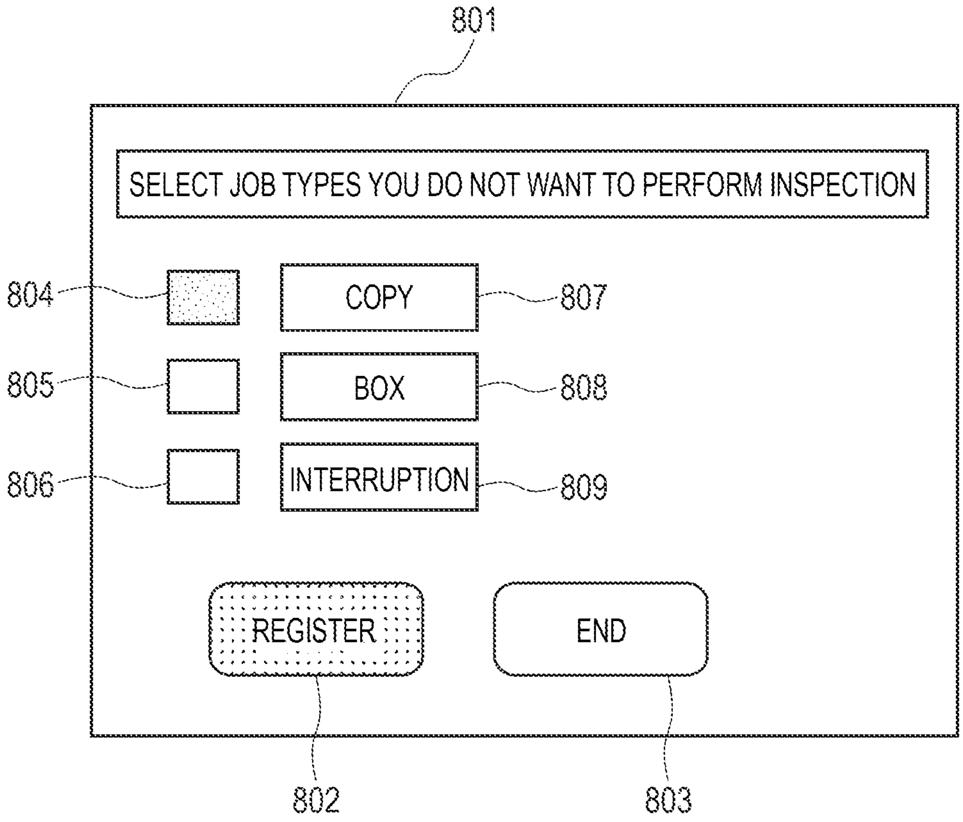
FIG. 8 is a diagram showing an example of a screen for registering job types that do not require inspection.

First, with reference to FIG. 8, an example of a screen (hereinafter also referred to as a "registration screen 801") displayed on the UI panel 102 for receiving from a user an instruction for registering job types that require no inspection will be described.

The symbols 804 to 806 denote check boxes for receiving from the user the selection of job types requiring no inspection. The symbols 807 to 809 denote job types associated with the check boxes 804 to 806, respectively. In the example shown in FIG. 8, a "copy job", a "BOX" job, and an "interrupt" job are displayed as job types that can be registered as job types requiring no inspection.

The symbol 802 denotes a setting button for receiving from a user an instruction for registering a job type that requires no inspection. If the setting button 802 is pressed, the job type associated with the selected check box among the check boxes 804 to 806 is registered as a job type requiring no inspection.

The symbol 803 denotes an end button for receiving from the user an instruction for ending registration of job types requiring no inspection. If the end button 803 is pressed, the process related to the registration of the job types requiring no inspection is finished, and the display of the registration screen 801 is closed.

Next, with reference to FIG. 9, an example of the processing performed by the printer 101 in relation to the registration of job types requiring no inspection will be described. In the example shown in FIG. 9, various instructions are received from the user via the registration screen 801 described with reference to FIG. 8.

In step S901, the CPU 201 causes the UI panel 102 to display the registration screen 801.

In step S902, the CPU 201 determines whether or not an instruction for terminating the registration of job types requiring no inspection has been received (that is, whether or not the end button 803 has been pressed).

Figure 9:
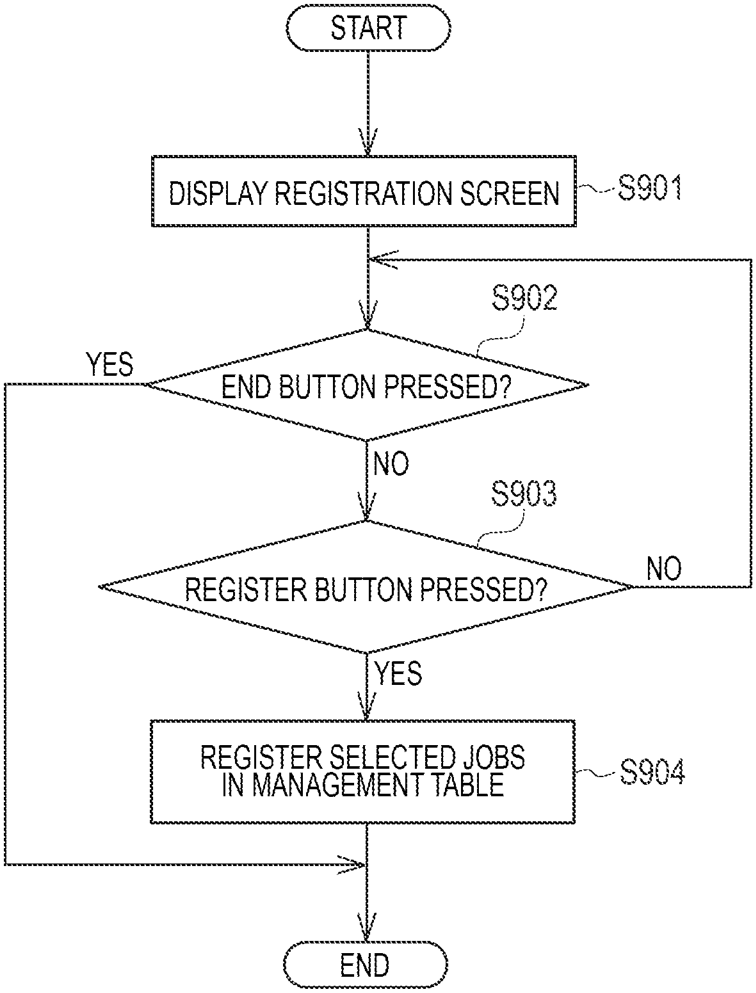
FIG. 9 is a flowchart showing an example of the processing of the printer.

If the CPU 201 determines that the instruction for terminating the registration of the job types requiring no inspection has been received in step S902, the CPU 201 terminates the series of processes shown in FIG. 9.

If the CPU 201 determines that the instruction for terminating the registration of job types requiring no inspection is not received in step S902, the CPU 201 advances the process to step S903.

In step S903, the CPU 201 determines whether or not an instruction for registering job types requiring no inspection has been received (that is, whether or not the setting button 802 has been pressed).

If the CPU 201 determines in step S903 that an instruction related to the registration of job types requiring no inspection has not been received, the CPU 201 advances the process to step S902. In this case, the process is executed again from step S902.

Figure 10:
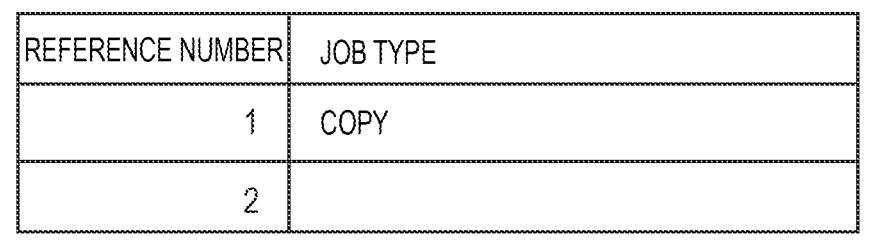

If the CPU 201 determines that an instruction related to the registration of job types requiring no inspection has been received in step S903, the CPU 201 advances the process to step S904. In step S904, the CPU 201 registers a job type selected via the check boxes 804 to 806 in the management table shown in FIG. 10. FIG. 10 shows an example of a management table (hereinafter also referred to as a "user registration management table") related to management of job types requiring no inspection that are registered based on an instruction from the user. In the example shown in FIG. 10, the "copy job" is registered as a job type requiring no inspection based on an instruction from the user.

Upon completion of the process relating to the registration of job types requiring no inspection, which is indicated as step S904, the CPU 201 terminates the series of processes shown in FIG. 9.

Figure 11:
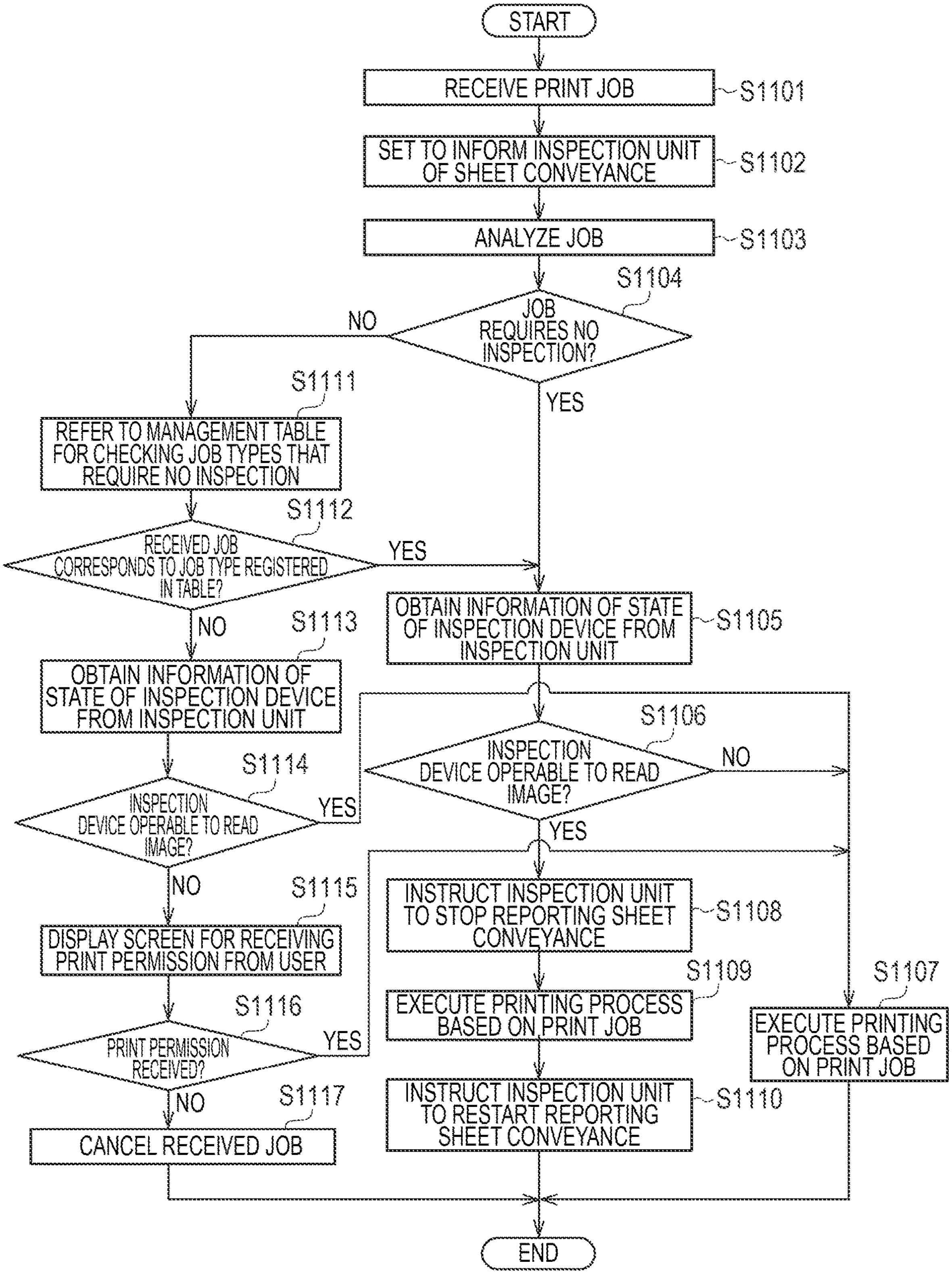
FIG. 11 is a flowchart showing an example of the processing of the printer and the inspection unit.

Next, with reference to FIG. 11, as an example of the processing of the printer 101 and the inspection unit 106 in the inspection system according to the present modification, the processing in the case of managing job types requiring no inspection by using the user registration management table shown in FIG. 10 will be described.

In step S1101, the CPU 201 receives a print job.

In step S1102, the CPU 201 sets the inspection unit 106 to let the inspection apparatus I/F 215 notify the inspection unit I/F 231 of each conveyance of the sheet to be inspected.

In step S1103, the CPU 201 analyzes the job received in step S1101.

In step S1104, the CPU 201 compares the analysis result of the job in step S1103 with the management table shown in FIG. 7, and determines whether the received job corresponds to a job type requiring no inspection.

If the CPU 201 determines in step S1104 that the received job corresponds to a job type requiring no inspection, the CPU 201 advances the process to step S1105. In step S1105, the CPU 201 acquires from the inspection unit 106 information about a state of reading the image of the inspection apparatus 108 (for example, information indicating whether or not the image can be read).

In step S1106, the CPU 201 determines, based on the information acquired in step S1105, whether or not the inspection apparatus 108 is operable to read the image.

If it is determined in step S1106 that the inspection apparatus 108 is not operable to read the image, the CPU 201 advances the process to step S1107. In step S1107, the CPU 201 executes a process related to printing based on the print job received in step S601.

If the CPU determines in step S1106 that the inspection apparatus 108 is operable to read the image, the CPU 201 advances the process to step S1108. In step S1108, the CPU 201 updates the setting to stop sending to the inspection unit 106 the notification from the inspection apparatus I/F 215 to the inspection unit I/F 231 for each conveyance of the sheet to be inspected. Thereby, the provision of a captured image (i.e., an image to be inspected) in accordance with a result of the captured surface to be inspected of the printed matter by the inspection unit 106 from the inspection unit 106 to the inspection apparatus 108 is restricted.

Then, in step S1109, the CPU 201 executes processing related to printing based on the job received in step S1101.

Then, in step S1110, the CPU 201 updates the setting again for the inspection unit 106 to resume the notification from the inspection apparatus I/F 215 to the inspection unit I/F 231 for each conveyance of the sheet to be inspected. As a result, in the subsequent processing, the restriction on the provision of the captured image from the inspection unit 106 to the inspection apparatus 108 in accordance with a result of the captured surface to be inspected of the printed matter by the inspection unit 106 is removed.

If the CPU 201 determines in step S1104 that the received job do not correspond to a job type requiring inspection, the CPU 201 advances the process to step S1111. In step S1111, the CPU 201 refers to the user registration management table shown in FIG. 10 to check the registered job types requiring no inspection based on an instruction from the user.

In step S1112, the CPU 201 determines whether or not the job received in step S1101 is registered as a job type requiring no inspection.

If the CPU 201 determines in step S1112 that the job type of the target job is registered as a job type not requiring inspection, the CPU 201 advances the process to step S1105. The processes after step S1105 are same as the process after step S605 described in FIG. 6.

If the CPU 201 determines that the target job is not registered as a job type requiring no inspection in step S1112, the CPU advances the process to step S1113. In step S1113, the CPU 201 acquires from the inspection unit 106 information about a state of reading the image of the inspection apparatus 108.

In step S1114, the CPU 201 determines, based on the information acquired in step S1113, whether or not the inspection apparatus 108 is operable to read the image.

If it is determined in step S1114 that the inspection apparatus 108 is operable to read the image, the CPU 201 advances the process to step S1107. In step S1107, the CPU 201 executes processing related to printing based on the job received in step S1101.

If the CPU determines in step S1114 that the inspection apparatus 108 is not operable to read the image, the CPU 201 advances the process to step S1115. In step S1115, the CPU 201 causes the UI panel 203 to display a screen (not shown) for receiving permission for printing the job from the user. The CPU 201 receives permission for printing the job from the user through the screen.

In step S1116, the CPU 201 determines whether or not permission for printing the job has been received from the user via the screen displayed on the UI panel 203 in step S1115.

If the CPU 201 determines that the permission for printing the job has been received from the user in step S1116, the CPU advances the process to step S1107. In step S1107, the CPU 201 executes processing related to printing based on the job received in step S1101.

If it is determined in step S1116 that the permission for printing the job has not been received from the user, the CPU 201 advances the process to step S1117. In step S1117, the CPU 201 cancels the job received in step S1101. Thus, the execution of processing related to printing based on the job is restricted.

In the present modification, a job type of a job requiring no inspection based on an instruction from the user is subject to registration, but the operation of the inspection system according to the present modification is not necessarily limited to the above configuration. That is, the information to be registered is not limited to the job type as long as it is possible to specify the job for which no inspection is required. As a specific example, it is also possible to control the operations of the inspection system such that information about jobs other than job types like names of specific jobs are to be registered, and a job holding specific information is considered as requiring no inspection.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, the system configuration described with reference to FIG. 1 is only an example, and the system configuration of the inspection system according to the present embodiment is not limited as long as at least the inspection apparatus 108 and the printer 101 can operate independently and the various functions described above can be realized.

As a specific example, an information processing apparatus for controlling the operation of the printer 101 and the inspection unit 106 may be separately provided. In this case, the information processing apparatus may control the execution of the printing process by the printer 101 in accordance with the capability of the inspection apparatus 108 for reading an image (in other words, whether the inspection is feasible or not). In addition, the information processing apparatus may restrict the provision of a captured image from the inspection unit 106 to the inspection apparatus 108 in accordance with a captured result of the surface to be inspected of the printed matter by the inspection unit 106, depending on whether a target print job requires inspection or not.

According to the embodiment described above, it is possible to link the image inspection apparatus and the printer in a more suitable manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-112127, filed Jul. 6, 2021, which is hereby incorporated by reference herein in its entirety.

What is claimed is:

1. An information processing apparatus, comprising:
at least one processor; and
at least one memory coupled to the at least one processor and having instructions stored thereon that, when executed by the at least one processor, act as:
an obtaining unit configured to obtain information about whether or not an image inspection apparatus is operable to execute an inspection for a presence of defects in a scanned image of a surface, to be inspected, of a printed matter, when receiving a print job that requires the inspection for the presence of defects in the scanned image; and
a controller configured to:
execute printing based on the information obtained by the obtaining unit indicating that the image inspection apparatus is operable to execute the inspection for the presence of defects in the scanned image; and
display a screen indicating that the image inspection apparatus is not operable to execute the inspection for the presence of defects in the scanned image (i) before the printing, (ii) in a case where the received print job requires the inspection for the presence of defects in the scanned image, and (iii) based on the information obtained by the obtaining unit indicating that the image inspection apparatus is not operable to execute the inspection for the presence of defects in the scanned image.

2. The information processing apparatus according to claim 1, wherein the obtaining unit obtains the information about whether or not the image inspection apparatus is operable to execute the inspection from the image inspection apparatus.

3. The information processing apparatus according to claim 1, wherein:
the obtaining unit determines whether or not the inspection is required for a print job that is to be printed; and
in accordance with a result of the determining whether or not the inspection is required for the print job, the controller further controls provision of the scanned image corresponding to the printed matter as a result of executing the printing based on the print job.

4. The information processing apparatus according to claim 3, wherein the obtaining unit determines whether or not the inspection is required for the print job based on a result of an analysis of the print job.

5. The information processing apparatus according to claim 4, wherein the at least one memory has instructions stored thereon that, when executed by the at least one processor, further act as:
a registration unit configured to execute a process associated with registration of print jobs that do not require the inspection.

6. The information processing apparatus according to claim 3, wherein the controller restricts the provision of the scanned image corresponding to the printed matter printed based on the print job for the image inspection apparatus in a case where the obtained information indicates that the inspection is not required for the print job.

7. The information processing apparatus according to claim 1, wherein the controller executes the printing in a case where the obtained information indicates that the image inspection apparatus is not operable to execute the inspection and a permission for printing is received from a user through the displayed screen indicating that the image inspection apparatus is not operable to execute the inspection for the presence of defects in the scanned image.

8. The information processing apparatus according to claim 1, wherein the displayed screen indicating that the image inspection apparatus is not operable to execute the inspection for the presence of defects in the scanned image is a screen for receiving a permission for printing a job from a user.

9. The information processing apparatus according to claim 8, wherein the controller restricts the execution of the printing in a case where the obtained information indicates that the image inspection apparatus is not operable to execute the inspection and a permission for printing is not received from a user through the displayed screen.

10. The information processing apparatus according to claim 1, wherein the controller is further configured to execute the printing without displaying the screen indicating that the image inspection apparatus is not operable to execute the inspection for the presence of defects in the scanned image based on the information obtained by the obtain unit indicating that the image inspection apparatus is operable to execute the inspection.

11. The information processing apparatus according to claim 1, wherein:

the obtaining unit is configured to determine whether or not the received print job requires the inspection for the presence of defects;

in response to the obtaining unit determining that the received print job requires the inspection for the presence of defects, the obtaining unit is configured to obtain the information about whether or not the image inspection apparatus is operable to execute the inspection for the presence of defects; and in response to the obtaining unit obtaining the information indicating that the image inspection apparatus is not operable to execute the inspection for the presence of defects, the controller is configured to display, before the printing the received print job, the screen indicating that the image inspection apparatus is not operable to execute the inspection for the presence of defects in the scanned image.

12. The information processing apparatus according to claim 1, wherein the controller is further configured to not display the screen indicating that the image inspection apparatus is not operable to execute the inspection for the presence of defects in the scanned image before the printing in a case where the received print job does not require the inspection for the presence of defects in the scanned image.

13. The information processing apparatus according to claim 1, wherein:

the obtaining unit is configured to determine whether or not the received print job requires the inspection for the presence of defects;

in response to the obtaining unit determining that the received print job does not require the inspection for the presence of defects, the obtaining unit is configured to obtain the information about whether or not the image inspection apparatus is operable to execute the inspection for the presence of defects; and in response to the obtaining unit obtaining the information indicating that the image inspection apparatus is not operable to execute the inspection for the presence of defects, the controller is configured to print the received print job without displaying the screen indicating that the image inspection apparatus is not operable to execute the inspection for the presence of defects in the scanned image.

14. An information processing method executed by an information processing apparatus comprising:

obtaining information about whether or not an image inspection apparatus is operable to execute an inspection for a presence of defects in a scanned image of a surface, to be inspected, of a printed matter, when receiving a print job that requires the inspection;

executing printing based on the obtained information indicating that the image inspection apparatus is operable to execute the inspection; and displaying a screen indicating that the image inspection apparatus is not operable to execute the inspection for the presence of defects in the scanned image (i) before the printing, (ii) in a case where the received print job requires the inspection for the presence of defects in the scanned image, and (iii) based on the obtained information indicating that the image inspection apparatus is not operable to execute the inspection for the presence of defects in the scanned image.

15. An inspection system comprising:

a printer configured to execute printing based on a received print job;

an image inspection apparatus configured to execute an inspection for a presence of defects in a scanned image of a surface, to be inspected, of a printed matter;

at least one processor; and at least one memory coupled to the at least one processor and having instructions stored thereon that, when executed by the at least one processor, act as:

an obtaining unit configured to obtain information about whether or not the image inspection apparatus is operable to execute the inspection for the presence of defects in the scanned image; and a controller configured to:

execute printing based on the information obtained by the obtaining unit indicating that the image inspection apparatus is operable to execute the inspection for the presence of defects in the scanned image; and display a screen indicating that the image inspection apparatus is not operable to execute the inspection for the presence of defects in the scanned image (i) before the printing, (ii) in a case where the received print job requires the inspection for the presence of defects in the scanned image, and (iii) based on the information obtained by the obtaining unit indicating that the image inspection apparatus is not operable to execute the inspection for the presence of defects in the scanned image.

16. The inspection system according to claim 15, wherein the printer comprises at least one of the obtaining unit and the controller.

17. The inspection system according to claim 15, further comprising an information processing apparatus that is different from the printer and the image inspection apparatus, wherein the information processing apparatus comprises at least one of the obtaining unit and the controller.

18. An inspection system comprising:

a printer configured to execute printing based on a received print job;

an image inspection apparatus configured to execute an inspection for a presence of defects in a scanned image of a surface, to be inspected, of a printed matter;

at least one processor; and at least one memory coupled to the at least one processor and having instructions stored thereon that, when executed by the at least one processor, act as:

a controller configured to:

display a screen indicating that the image inspection apparatus is not operable to execute the inspection for the presence of defects in the scanned image (i) before executing the printing, (ii) in a case where the received print job requires the inspection for the presence of defects in the scanned image, and (iii) when the image inspection apparatus is in a state of being not operable to execute the inspection for the presence of defects in the scanned image.

19. The inspection system according to claim 18, wherein the controller is further configured to:

execute the printing when the image inspection apparatus is in a state of being operable to execute the inspection for the presence of defects in the scanned image.

20. The inspection system according to claim 18, wherein the controller is further configured to:

in response to receiving an instruction to permit the execution of the printing from a user, execute the printing when the image inspection apparatus is in the state of being not operable to execute the inspection for the presence of defects in the scanned image.

21. The inspection system according to claim 20, wherein the instruction to permit the execution of the printing is received via the screen.

22. The inspection system according to claim 20, wherein the controller is further configured to:

restrict the execution of the printing when the image inspection apparatus is in the state of being not operable to execute the inspection for the presence of defects in the scanned image and in a case where the instruction to permit the execution of the printing is not received from the user.

* * * * *